Oct. 9, 1951  W. SIEGERIST  2,570,604
MOUNTING FOR SHEAVES AND THE LIKE
Filed March 9, 1946  2 Sheets-Sheet 1
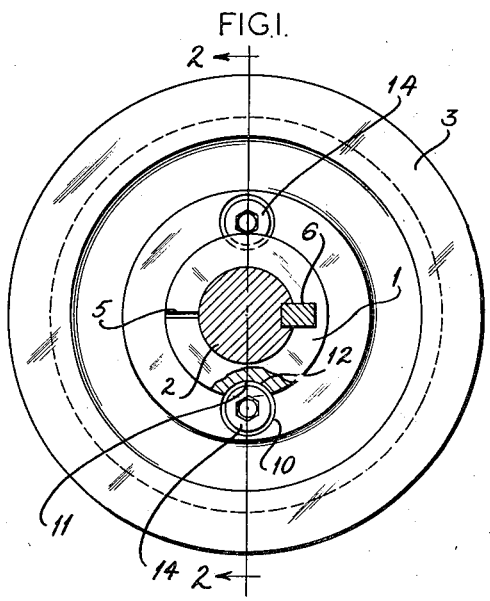
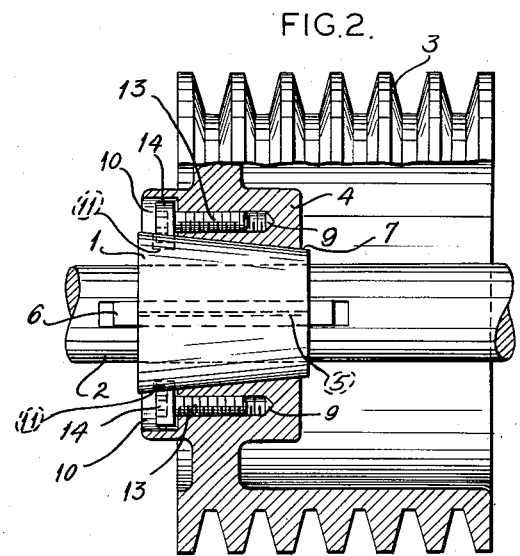
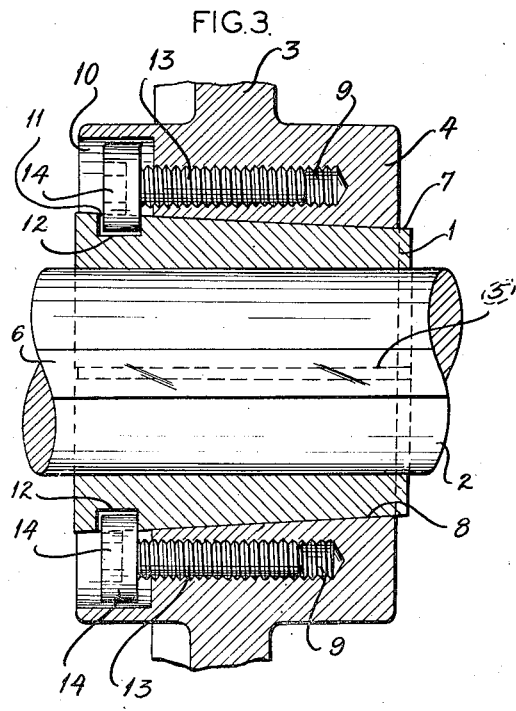
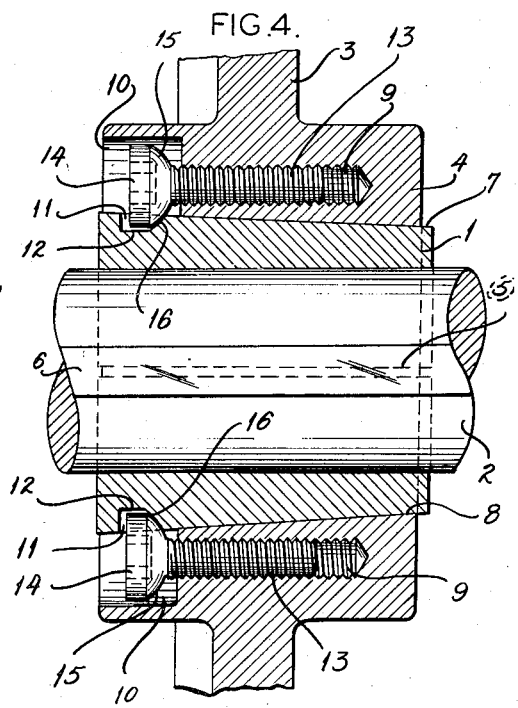
INVENTOR:
Walter Siegerist,
by Carr Karr Bravely,
HIS ATTORNEYS.

Oct. 9, 1951     W. SIEGERIST     2,570,604
MOUNTING FOR SHEAVES AND THE LIKE
Filed March 9, 1946     2 Sheets-Sheet 2
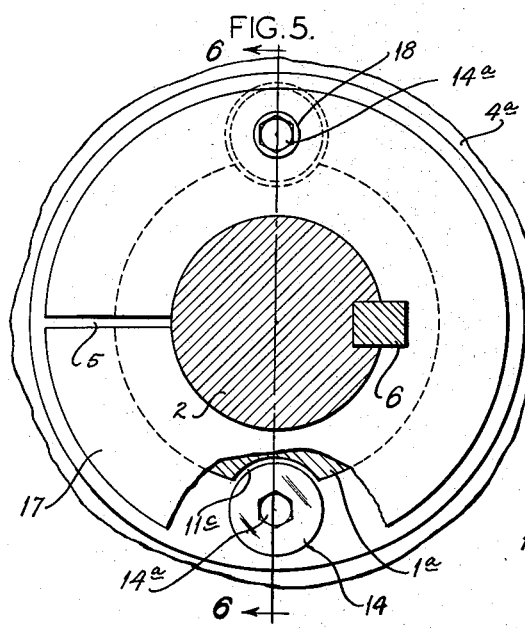
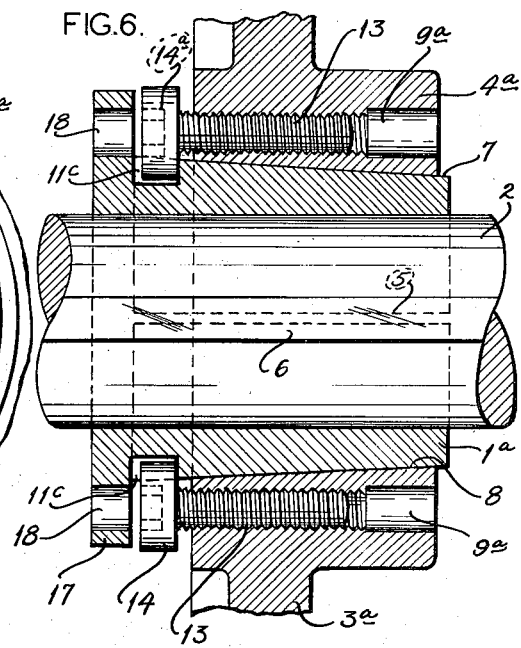
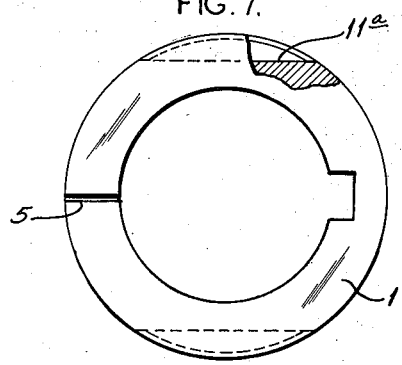
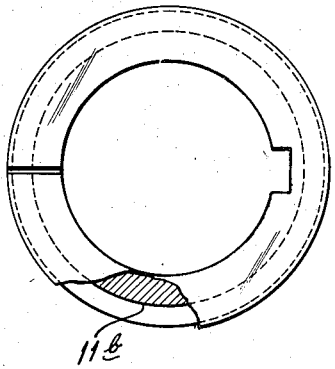
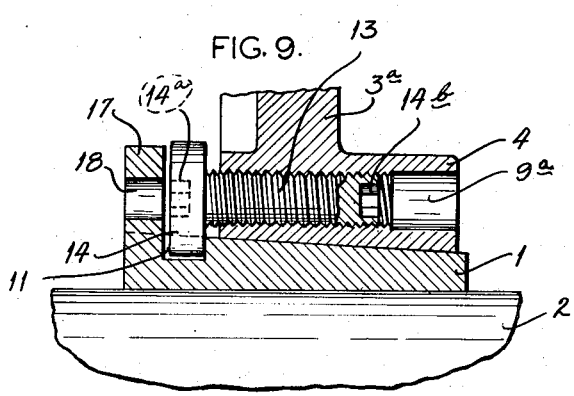
INVENTOR:
Walter Siegerist,
by Carr Carr Gravely,
HIS ATTORNEYS.

Patented Oct. 9, 1951

2,570,604

UNITED STATES PATENT OFFICE 2,570,604

MOUNTING FOR SHEAVES AND THE LIKE

Walter Siegerist, University City, Mo.

Application March 9, 1946, Serial No. 653,364

21 Claims. (Cl. 287—52)

This invention relates generally to the mounting of sheaves, gears, sprocket wheels and other rotary driving or driven power transmission members on their shafts, and more particularly to mountings of the type comprising a split bushing, which is keyed to the shaft and has a tapered seat that fits within the tapered bore of said power transmission member, and means for causing relative axial movement of said bushing and power transmission member to draw the latter tight on the tapered seat of said bushing and to contract the latter against said shaft.

The invention has for its principal objects to provide for quickly and easily seating the power transmission member tightly on the tapered bushing and for rigidly clamping said bushing on the shaft and for readily unseating said power transmission member and for releasing the contracted bushing, to provide means whereby the axial thrust, which seats the power transmission on the bushing, is resolved into a radial thrust for clamping the bushing on the shaft, to provide for the unit mounting and dismounting of the bushing and power transmission member and the locking means therefor, to provide for keying said bushing and said power transmission member together before they are fully seated, to provide for simplicity and cheapness of construction and compactness of design and to obtain other advantages hereinafter appearing. The invention consists in the unit-handled mounting for sheaves and the like and in the parts and combinations and arrangements of parts hereinafter described and claimed.

In the accompanying drawings, which form part of this specification, and wherein like symbols refer to like parts wherever they occur, Fig. 1 is an end elevational view of a sheave provided with a mounting embodying my invention, Fig. 2 is a longitudinal sectional view on the line 2—2 in Fig. 1, Fig. 3 is an enlarged fragmentary sectional view similar to Fig. 2, Fig. 4 is a view similar to Fig. 3, showing a modified form of sheave mounting, Fig. 5 is a view similar to Fig. 1, showing another modified form of sheave mounting, Fig. 6 is a longitudinal sectional view on the line 6—6 in Fig. 5, Figs. 7 and 8 are end elevational views of two modified forms of tapered bushings; and Fig. 9 is a fragmentary sectional view similar to Fig. 6, showing another modification of the invention.

In the accompanying drawings, my invention is shown embodied in a mounting for a rotary power transmission member, said mounting including a bushing 1 mounted on a shaft 2 and a sheave 3 having a hub portion 4 fitting on said bushing. The bushing 1 is split longitudinally, as at 5, from end to end on one side thereof and may be secured to the shaft 2 for the transmission of the driving torque by a key 6 preferably located diametrically opposite said slit. The bushing 1 has a conical outer peripheral seat 7 which tapers from end to end of said bushing and the hub 4 of the sheave 3 has a correspondingly tapered conical bore 8 fitting on said conical seat.

The hub 4 of the sheave 3 has two diametrically opposite screw holes 9 formed therein parallel to the rotary axis thereof. Each of the screw holes 9 terminates short of the end of the hub 4 at the small end of the bore 8 therein and opens into an arcuate recess or pocket 10 in the opposite end face of said hub. This arcuate recess or counterbore 10 is disposed concentric with the screw hole 9 and opens sidewise into the conical bore 8 in the hub 4.

The bushing 1 has two diametrically opposite grooves 11 formed in its tapered outer peripheral surface 7 adjacent to the large end thereof. The external peripheral grooves 11 extend at right angles to the axis of the bushing 1 and have circumferentially concave bottoms 12 whose radius of curvature corresponds to the radius of curvature of the circular pockets or recesses 10 in the hub 4 of the sheave 3. The grooves 11 are of less width than the depth of the circular pockets 10 and are adapted when the hub is seated on the bushing to be positioned substantially midway of the depth thereof and to form therewith substantially continuous circular pockets.

Threaded into each of the longitudinal screw holes 9 in the hub 4 of the sheave 3 is a sockethead screw 13 whose head 14 is located in the pocket 10 at the outer end of said screw hole and extends on one side into the groove 11 in communication therewith in position to bear endwise against the shoulder formed by one side wall of said groove when the screw is tightened and against the shoulder formed by the other side wall of said groove when said screw is loosened. The bushing 1 and sheave 3 are loosely assembled for unit handling by entering the small end of said bushing into the large end of the axial bore 8 of said sheave, placing the heads 14 of cap screws 13 in the external peripheral grooves 11 in said bushing and threading said screws partway into the screw holes 9 in the hub 4 of said sheave, thereby loosely connecting said bushing and sheave together against axial separation and for joint rotary movement. Wrenches are then inserted in the central flat-sided sockets 14a in the heads 14 of the two screws 13 and said screws are alternately turned until the tapered external peripheral surface 7 of the bushing 1 seats in the tapered bore 8 of the sheave 3. The two screws 13 are then tightened simultaneously to tightly seat the hub 4 of the sheave 3 on the conical surface 7 of the bushing and to contract the bushing 1 tightly against the shaft 2. If desired, the sheave 3 and bushing 1 may be assembled by placing the bushing on the shaft 2 and then bringing the sheave over the bushing, or the sheave may be placed over the shaft and the bushing brought into position. When the screws 13 are tightened, the heads 14 thereof bear endwise against the inner side walls of the cross grooves 11 in the bushing, thereby drawing the hub and bushing tightly together in an endwise direction. This tightening of the screws 13 tends to tilt the heads 14 thereof and thus create a diagonal reactional force against the hub 4, which force is resolved into a radial force, which rigidly clamps the split bushing 1 on the shaft 2.

As shown in Fig. 4, the underside of the head 14 of each locking screw 13 may be provided with a convex spherical surface 15 and the inner side wall of the groove 11 may be provided with a concave spherical surface 16 so as to accentuate the radial thrust transmitted to the bushing when said screw is tightened.

As shown in Fig. 7, the screw head receiving portion of the bushing may be in the form of a flat-bottomed groove 11a disposed transversely of said bushing. As shown in Fig. 8, the screw head receiving portion of the bushing may also be formed by means of a continuous annular groove 11b therein.

In the modification shown in Figs. 5 and 6 the screw holes 9a are formed by drilling holes through the sheave hub from end to end thereof and then tapping one end portion only of said holes; and the threaded ends of said holes open through said hub at the large diameter end of the tapered bore therein without being counterbored. In this construction, the screw head receiving grooves 11c in the bushing 1a are located outside of the hub 4a of the sheave 3a; and the outer side walls of said grooves are formed by an outstanding circumferential flange 17 on the large end of said bushing. This flange overlaps the entire head portions 14 of the socket-head cap screws 13 and has holes 18 adapted to register therewith through which access may be had to the sockets in said heads.

The construction shown in Fig. 9 is similar to that shown in Figs. 5 and 6, except that the locking screw has a wrench socket 14b in its threaded end similar to the wrench socket 14a in its head end. With this construction, when access cannot be had to the socket 14a in the screw heads at one end of the mounting, the mounting may be readily locked and unlocked from the other end by engaging the wrench with the sockets 14b in the threaded ends of said screws.

The hereinbefore described sheave mountings have numerous advantages. The sheave and bushing and the adjusting means therefor may be readily applied to and removed from the shaft as a complete loosely assembled unit. The sheave may be quickly and easily seated on the bushing and the bushing quickly and easily clamped to the shaft merely by tightening the two diametrically opposite screws; and the sheave and bushing may be readily released merely by loosening said screws. The screws create an axial movement of the hub and sheave, which movement firmly seats the tapered surface of the bushing in the tapered bore of the sheave; and the reaction between the screws and the bushing tends to tilt the screw heads and creates against the hub of the sheave a diagonal reaction which is resolved into an inward radial thrust which closes the split bushing on the shaft 1. In all the above constructions, except that shown in Fig. 8, the screw heads seat in the concave external peripheral groove in the bushing and serve to key the bushing and sheave together for joint rotary movement relative to the shaft to bring the keyways of said bushing and shaft into register. The sleeve and bushing may be made of substantially the same length, and the screw heads are easily accessible and do not project beyond the end of the bushing. The arcuate screw head receiving recesses or pockets in the sheave hub may be easily and economically formed by a simple boring operation, and the screw head receiving grooves in the bushing may be formed by a simple milling, slotting or turning operation.

Obviously, numerous changes may be made without departing from the invention, and I do not wish to be limited to the precise constructions shown.

What I claim is:

1. A mounting for sheaves and the like comprising a shaft, a longitudinally slitted bushing mounted on said shaft and having a tapered peripheral seat, a sheave or the like having a tapered axial bore receiving said tapered seat, said bushing having two depressed peripheral shoulders spaced apart longitudinally thereof adjacent to one end of said sheave and said end of said sheave having a longitudinal screw hole located entirely therein at said end thereof, and a screw threaded into said screw hole and having a portion of its head disposed between said shoulders and adapted when the screw is turned in one direction to bear against one of said shoulders and thereby cause relative axial movement of said bushing and sheave in one direction to tighten said sheave on said tapered seat and to contract said bushing on said shaft and adapted when said screw is turned in the other direction to bear against the other shoulder and thereby cause relative axial movement of said bushing and sheave in the other direction to loosen said sheave on said tapered seat and said bushing on said shaft.

2. A mounting for sheaves and the like comprising a shaft, a longitudinally slitted bushing mounted on said shaft and having a tapered peripheral seat, a sheave or the like having a tapered axial bore receiving said tapered seat, said bushing having two depressed transverse peripheral shoulders spaced apart circumferentially thereof, said sheave having two similarly spaced longitudinal screw holes located entirely therein, and screws threaded into said screw holes and having head portions adapted when said screws are tightened to bear against said shoulder and thereby cause relative axial movement of said bushing and sheave to tighten said sheave on said tapered seat and to contract said bushing against said shaft.

3. A mounting for sheaves and the like comprising a shaft, a longitudinally slitted bushing mounted on said shaft and having a tapered peripheral seat, a sheave or the like having a tapered axial bore receiving said tapered seat, said bushing having a peripheral recess therein, said sheave having a longitudinal screw hole formed entirely therein and a screw threaded into said screw hole and having a head portion disposed in said recess for keying together said bushing and sheave and adapted when said screw is tightened to bear against one side of said recess and thereby cause relative axial movement of said bushing and sheave to tighten said sheave on said tapered seat and to contract said bushing against said shaft, the engaging surfaces of said side of said recess and screw head being spherically curved.

4. A mounting for sheaves and the like comprising a shaft, a longitudinally slitted bushing mounted on said shaft and having a tapered peripheral seat, a sheave or the like having a tapered axial bore receiving said tapered seat, said bushing having two peripheral cross grooves spaced apart circumferentially thereof, said sheave having two similarly spaced longitudinal screw holes located entirely therein, and screws threaded into said screw holes and having heads disposed in the respective grooves for keying said bushing and sheave together and adapted when said screws are tightened to bear against one side of said grooves and thereby cause relative axial movement of said sheave and bushing in a direction that will tighten said sheave on said tapered seat and clamp said bushing to said shaft and adapted when said screws are loosened to bear against the other side of said grooves and thereby cause relative axial movement of said sheave and bushing in a direction that will loosen said sheave on said tapered seat and said bushing on said shaft.

5. A mounting for sheaves and the like comprising a shaft, a longitudinally slitted bushing mounted on said shaft and having a tapered peripheral seat, a sheave or the like having a tapered axial bore receiving said tapered seat, said bushing having two diametrically opposite peripheral cross grooves, said sheave having two diametrically opposite longitudinal screw holes formed entirely therein, and screws threaded into said screw holes and having portions of their heads disposed in the respective grooves for keying said bushing and sheave together and adapted when the screws are turned in one direction to bear against one side of said grooves and thereby cause relative axial movement of said bushing and sheave in one direction to tighten said sheave on said tapered seat and to contract said bushing on said shaft and adapted when said screws are turned in the opposite direction to bear against the other side of said grooves and thereby cause relative axial movement of said bushing and sheave in the other direction to loosen said sheave on said tapered seat and said bushing on said shaft.

6. A mounting for sheaves and the like comprising a shaft, a longitudinally slitted bushing mounted on said shaft and having a tapered peripheral seat, a sheave or the like having a tapered axial bore receiving said tapered seat, said sheave having a plurality of circumferentially spaced screw holes located entirely therein parallel to the axis thereof, said screw holes having at one end of said sheave counterbored end portions that open on one side into the tapered bore of said sheave, said bushing having a plurality of peripheral cross grooves therein corresponding in spacing to said screw holes and registering with the side openings in the counterbored end portions of the respective screw holes, and screws threaded into said screw holes and having heads located in the counterbored end portions thereof, portions of said heads being disposed in said grooves for keying said bushing and sheave together and adapted when said screws are turned in one direction to bear against one side of said grooves and thereby cause relative axial movement of said bushing and sheave in one direction to tighten said sheave on said tapered seat and to contract said bushing on said shaft and adapted when said screws are turned in the opposite direction to bear against the other side of said grooves and thereby cause relative axial movement of said bushing and sheave in the other direction to loosen said sheave on said tapered seat and said bushing on said shaft.

7. A mounting for sheaves and the like comprising a shaft, a longitudinally slitted bushing mounted on said shaft and having a tapered peripheral seat, a sheave or the like having a tapered axial bore receiving said tapered seat, said sheave having two diametrically opposite screw holes located entirely therein parallel to the axis thereof, said screwholes having at one end of said sheaves counterbored end portions that open laterally into opposite sides of the tapered bore of said sheave, said bushing having two diametrically opposite peripheral cross grooves therein that register with the lateral openings in said counterbored end portions of the respective screw holes, and screws threaded into said screw holes and having heads located in the counterbored end portions thereof, said grooves having peripherally concave bottoms substantially concentric with the respective counterbores, portions of said heads being disposed in said grooves for keying said bushing and sheave together and adapted when said screws are turned in one direction to bear against one side of said grooves and thereby cause relative axial movement of said bushing and sheave in one direction to tighten said sheave on said tapered seat and to contract said bushing on said shaft and adapted when said screws are turned in the opposite direction to bear against the other side of said grooves and thereby cause relative axial movement of said bushing and sheave in the other direction to loosen said sheave on said tapered seat and said bushing on said shaft.

8. A mounting for sheaves and the like comprising a shaft, a longitudinally slitted bushing mounted on said shaft and having a tapered peripheral seat, a sheave or the like having a tapered axial bore receiving said tapered seat, said sheave having a plurality of complete circumferentially spaced longitudinal screw holes in one end thereof, said bushing having a plurality of similarly circumferentially spaced peripheral cross grooves therein outwardly of said end of said sheave, and screws threaded into said screw holes and having heads with portions disposed in said grooves for keying said bushing and sheave together and adapted when said screws are tightened to bear against the inner sides of said grooves and thereby cause relative axial movement of said bushing and sheave in one direction to tighten said sheave on said tapered seat and to contract said bushing on said shaft and adapted when said screw is loosened to bear against the outer sides of said grooves and thereby cause relative axial movement of said bushing and sheave in the other direction to loosen said sheave on said tapered seat and said bushing on said shaft.

9. A mounting for sheaves and the like comprising a shaft, a longitudinally slitted bushing mounted on said shaft and having a tapered peripheral seat, a sheave or the like having a tapered axial bore receiving said tapered seat, said bushing having two diametrically opposite peripheral cross grooves therein located adjacent to one end of said bushing outwardly of the corresponding end of said sheave, said end of said bushing having two longitudinal diametrically opposite screw holes therein, and screws threaded into said holes and having heads with portions disposed in said grooves adapted when said screws are tightened to bear against one side of said grooves and thereby cause relative axial movement of said sheave and bushing in one direction to tighten said sheave on said tapered seat and to clamp said bushing to said shaft and adapted when said screws are loosened to bear against the other side of said grooves and thereby cause relative axial movement of said sheave and bushing in the opposite direction to release said sheave from said tapered seat and to release said bushing from said shaft, said end of said bushing having an outstanding peripheral flange that overlaps said screw heads, said flange having openings therethrough opposite said screw heads and through which access may be had to said screw heads.

10. A power transmission mounting comprising a shaft, a longitudinally slitted bushing mounted on said shaft and having a tapered peripheral seat, a power transmission member having a tapered axial bore receiving said tapered seat, and a threaded hole extending through said member from end to end thereof substantially parallel to the axis of said axial bore, said bushing having a peripheral shoulder disposed crosswise of the axis thereof, and a screw threaded into said threaded hole and having a head portion at one end and a recess in its other end, whereby said screw may be manipulated from either end of said mounting, said head portion of said screw being adapted when said screw is tightened to bear against said shoulder and thereby cause relative axial movement of said bushing and said power transmission member to tighten the latter on said tapered seat and contract said bushing against said shaft.

11. A mounting for sheaves and the like comprising a shaft, a longitudinally slitted bushing mounted on said shaft and having a tapered peripheral seat, a sheave or the like having a tapered axial bore receiving said tapered seat, said bushing having two diametrically opposed recesses in the peripheral surface thereof, said sheave having two diametrically opposite longitudinal screw holes located entirely therein, and screws threaded into said screw holes and having portions of their heads disposed in the respective recesses for connecting said bushing and sheave together against axial separation and for joint rotary movement, said heads of said screws being adapted when said screws are turned in one direction to bear against one side of said recesses and thereby cause relative axial movement of said bushing and sheave in one direction to tighten said sheave on said tapered seat and to contract said bushing on said shaft and being adapted when said screws are turned in the opposite direction to bear against the opposite side of said recesses and thereby cause relative axial movement of said bushing and sheave in the other direction to loosen said sheave on said tapered seat and said bushing on said shaft.

12. A shaft-mountable unit comprising a taper bored hub, a tapered split contractible bushing fitting therein, longitudinally disposed cap screws threaded in the hub and having their heads within the hub, said screws being inserted from the hub end of largest inside diameter and being so centered that their heads extend into the hub bore, said hub having threaded holes for said screws with counterbored outer portions in which said heads are partially contained, the walls of which counterbored portions are cut for their full lengths by the hub bore so that they are particircular in cross section, said bushing having in spaced relation from its large end recessed portions forming longitudinally spaced thrust-sustaining shoulders between which said heads extend, said counterbored portions of said screw holes being of greater length than the distance from said hub end to the plane of the inner of said shoulders when the bushing is closely fitted in the hub, and said screws having means accessible to and engageable by a wrench for operating them, whereby the bushing can be wedged between the hub and a shaft by tightening the screws against the inner of said shoulders and can be dewedged by reversely operating and tightening the screws against the outer of said shoulders.

13. A shaft-mountable unit of the character described comprising, in combination, a bushing having an axial bore adapted to receive a shaft, said bushing being of sleevelike character and having a base, and a body provided with an external surface conically tapering away from said base, a machine element having a hub provided with an axial bore, said bore being tapered so as to be complementary to, and receivable upon, the tapered outer surface of the bushing body, an external surface portion of said base having a slot adjacent to, and in a plane parallel to, the end face of said hub, said end face having a threaded aperture, a screw seated in said aperture and rotatably advanceable and retractable therein, said screw having a transverse flange extendable into said slot, whereby rotation of said screw forces said flanges against the wall of said slot in the direction of screw travel, so as to produce relative movement between the complementary tapered surfaces of the hub and the bushing.

14. A shaft-mountable unit of the character described comprising, in combination, a bushing having an axial bore adapted to receive a shaft, said bushing being of sleevelike character and having a base, and a body provided with an external surface conically tapering away from said base, a machine element having a hub provided with an axial bore, said bore being tapered so as to be complementary to, and receivable upon, the tapered outer surface of the bushing body, an external surface portion of said base having a slot adjacent to, and in a plane parallel to, the end face of said hub, said slot extending peripherally completely around said base, said end face of said hub being provided with a plurality of threaded apertures spaced circumferentially therearound, and disposed slightly radially outwardly from the hub bore so as to be adjacent the base of said bushing, a plurality of screws disposed one in each aperture and rotatably advanceable and retractable therein, each such screw having a transverse flange extendable into said slot, whereby rotation of said screws forces their respective flanges against the wall of said slot in the direction of screw travel, so as to produce relative movement between the complementary tapered surfaces of the bushing and the hub.

15. A shaft-mountable unit of the character described comprising, in combination, a bushing having an axial bore adapted to receive a shaft, said bushing being of sleevelike character and having a base, and a body provided with an external surface conically tapering away from said base, a machine element having a hub provided with an axial bore, said bore being tapered so as to be complementary to, and receivable upon, the tapered outer surface of the bushing body, an external surface portion of said base having a slot adjacent to, and in a plane parallel to, the end face of said hub, said end face having a threaded aperture, a screw seated in said aperture and rotatably advanceable and retractable therein, said screw having a transverse flange extendable into said slot, whereby rotation of said screw forces said flange against the wall of said slot in the direction of screw travel, so as to produce relative movement between the complementary tapered surfaces of the hub and the bushing, said bushing having a longitudinal slot extending completely through the wall along one side thereof whereby the bushing is radially expandable and contractable, and whereby enforced relative endwise movement of said hub on said bushing causes contraction or permits expansion of the bushing dependent upon the direction of such movement.

16. A shaft-mountable unit comprising a taper bored hub, a tapered split contractible bushing fitting therein, longitudinally disposed cap screws threaded in the hub and having their heads within the hub, said screws being inserted from the hub end of largest inside diameter and being so centered that their heads extend into the hub bore, said hub having threaded holes for said screws with counterbored portions in which said heads are partially contained, the walls of which counterbored portions are cut for their full lengths by the hub bore so that they are parti-circular in cross section, said bushing having in spaced relation from its large end an annular groove into which said heads extend and the side walls of which form thrust-sustaining shoulders, said counterbored portions of the screw holes being of greater length than the distance from said hub end to the inner side wall of said groove when the bushing is closely fitted in the hub, and said screws having means accessible to and engageable by a wrench for operating them, whereby the bushing can be wedged between the hub and a shaft by tightening said screws against the inner side wall of said groove and can be dewedged by reversely operating and tightening said screws against the outer side wall of said groove.

17. A shaft-mountable unit according to claim 16 wherein the lengths of the screws and the clearances between their heads and the sides and bottom of said groove are such that the structure can be assembled by inserting the bushing in assembly with the screws part way into the hub and engaging the inner ends of the screws in the threaded portions of the screw holes and screwing them up in alternation with only about two applications of the wrench to each.

18. A shaft-mountable unit comprising a taper bored hub, a tapered split contractible bushing fitting therein, cap screws substantially parallel with the hub axis threaded in the hub and having their heads within the hub, said screws being inserted from the hub end of largest inside diameter and being so centered that their heads extend into the hub bore, said hub having threaded holes for said screws with counterbored outer portions in which the heads of said screws are partially contained, the walls of which counterbored portions are cut for their full lengths by the hub bore so that they are parti-circular in cross section, said bushing having in spaced relation from its larger end an annular groove into which said screw heads extend and whose side walls form thrust-sustaining shoulders, said counterbored portions of the screw holes being of greater length than the distance from said hub end to the inner side wall of said groove when the bushing is closely fitted in the hub, and said screws having means accessible to and engageable by a wrench for operating them, whereby the bushing can be wedged between the hub and a shaft by tightening said screws against the inner side wall of said groove and can be dewedged by reversely operating and tightening said screws against the outer side wall of said groove, the relation of the screw holes to the hub bore being such that under all conditions a substantial clearance exists between the outer ends of the screw shanks and the perimeter of the bushing which when loose in the hub can be rotated therein.

19. A shaft-mountable unit comprising a taper bored hub, a tapered split contractible bushing fitting therein, longitudinally disposed cap screws threaded in the hub and having their heads within the hub, said screws being inserted from the hub end of largest inside diameter and being so centered that their heads extend into the hub bore, said hub having threaded holes for said screws with counterbored outer portions in which said heads are partially contained, the walls of which counterbored portions are cut for their full lengths by the hub bore so that they are parti-circular in cross section, said bushing having in spaced relation from its large end an annular groove into which said heads extend and whose side walls provide thrust-sustaining shoulders, said counterbored portions of said screw holes being of greater length than the distance from said hub end to the inner side of said groove when the bushing is closely fitted in the hub, and said screws having means accessible to and engageable by a wrench for operating them, whereby the bushing can be wedged between the hub and a shaft by tightening said screws against the inner side wall of said groove and can be dewedged by reversely operating and tightening said screws against the outer side wall of said groove, said annular groove being of a width sufficiently greater than the longitudinal thickness of said heads to provide a pronounced clearance between said heads and outer side wall when said heads abut against said inner side wall, so that after the wedging operation the screws can be easily unscrewed sufficiently to loosen them before tightening them against said outer side wall to effect dewedging of the bushing.

20. A hub element for a unit of the class described comprising a taper bored hub having longitudinally disposed threaded screw holes arranged for insertion of cap screws thereinto from the hub end of largest inside diameter and having long counterbored outer portions for reception of cap screw heads, said screw holes being substantially parallel with the hub axis and so centered that the threaded portions thereof are spaced from the hub bore and completely circular in cross section for their full lengths while the walls of said counterbored portions are cut for their full lengths by the hub bore so that they are parti-circular in cross section, the slots through which said counterbored portions communicate with said bore being of such width that circular cap screw heads loosely fitting in said counterbored portions will protrude substantially into said bore.

21. For use in connecting a wheel with a shaft which extends therethrough, the combination of a hub adapted to fit within said wheel and about said shaft, means on said hub providing a pair of shoulders, and adjustable means carried by said wheel and having a flange adapted to fit between said shoulders whereby said latter means when moved in one direction positions said hub within said wheel and about said shaft by bearing against one shoulder and when moved in the opposite direction moves said hub outwardly of said wheel by bearing against the other shoulder.

WALTER SIEGERIST.

REFERENCES CITED

The following references are of record in the file of this patent:

UNITED STATES PATENTS

| Number | Name | Date |
|---|---|---|
| 783,762 | Stahl | Feb. 28, 1905 |
| 1,029,185 | Gray | June 11, 1912 |
| 2,396,414 | Firth | Mar. 12, 1946 |
| 2,402,743 | Firth | June 25, 1946 |

FOREIGN PATENTS

| Number | Country | Date |
|---|---|---|
| 42,126 | Germany | of 1888 |